(No Model.) 10 Sheets—Sheet 1.
J. HANLON.
PROCESS OF AND APPARATUS FOR MANUFACTURING GAS.
No. 311,124. Patented Jan. 20, 1885.

Fig. 1

WITNESSES:
INVENTOR (No Model.)

J. HANLON.
PROCESS OF AND APPARATUS FOR MANUFACTURING GAS.

No. 311,124. Patented Jan. 20, 1885.

Fig. 2.

WITNESSES:
INVENTOR

(No Model.)

J. HANLON.
PROCESS OF AND APPARATUS FOR MANUFACTURING GAS.

No. 311,124.

Patented Jan. 20, 1885.

(No Model.)

J. HANLON.
PROCESS OF AND APPARATUS FOR MANUFACTURING GAS.

No. 311,124.   Patented Jan. 20, 1885.

WITNESSES:

INVENTOR

ATTORNEY

(No Model.)

J. HANLON.
PROCESS OF AND APPARATUS FOR MANUFACTURING GAS.

Patented Jan. 20, 1885.

WITNESSES:
J. W. Reynolds
J. F. White

INVENTOR
John Hanlon
BY O. E. Duffy
ATTORNEY (No Model.)

J. HANLON.
PROCESS OF AND APPARATUS FOR MANUFACTURING GAS.

No. 311,124. Patented Jan. 20, 1885.

Fig. 6

WITNESSES:

INVENTOR
John Hanlon
BY
ATTORNEY (No Model.) 10 Sheets—Sheet 8.

J. HANLON.
PROCESS OF AND APPARATUS FOR MANUFACTURING GAS.

No. 311,124. Patented Jan. 20, 1885.

WITNESSES:
J. W. Reynolds
J. F. White

INVENTOR
John Hanlon
BY O. E. Duff
ATTORNEY

(No Model.) 10 Sheets—Sheet 9.
J. HANLON.
PROCESS OF AND APPARATUS FOR MANUFACTURING GAS.

No. 311,124. Patented Jan. 20, 1885.

WITNESSES:

INVENTOR
John Hanlon
BY
ATTORNEY

UNITED STATES PATENT OFFICE.

JOHN HANLON, OF NEW YORK, N. Y.

PROCESS OF AND APPARATUS FOR MANUFACTURING GAS.

SPECIFICATION forming part of Letters Patent No. 311,124, dated January 20, 1885.

Application filed April 30, 1884. (No model.)

*To all whom it may concern:*

Be it known that I, JOHN HANLON, of New York, in the county of New York and State of New York, have invented certain new and useful Improvements in Processes of and Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of gas for illuminating, heating, and motive-power purposes by the distillation of bituminous, fatty, or oleaginous substances, decomposing steam in contact with metallic and carbonaceous material, carbureting the resulting gases, then combining the gases and vapors and converting them into a homogeneous fixed gas of any desired candle-power by subjecting them to contact with heated refractory material in a fixing-chamber.

The object of the invention is to improve the process so as to secure better decomposition of steam in contact with metallic material, and thereby increase the proportion of hydrogen produced; also, to better distill bituminous, fatty, and oleaginous substances, and thereby increase the proportion of rich carbureted-hydrogen gas produced.

Another object of the invention is to improve the construction of the apparatus so as greatly to increase its capacity and at the same time maintain economy and efficiency in operation.

The process of making gas will be set forth in the description of the operation of the apparatus, and the particular process, as well as the parts and combinations of parts of the apparatus constituting my invention herein, will be pointed out in the claims.

I will now particularly describe my invention with reference to the accompanying drawings, in which Fig. 10 represents a horizontal section of the coal-hopper and valves. Fig. $10^a$ represents a front view of the pinion-wheels and lever for operating the valves and hopper. Fig. $10^b$ represents an elevation of the valve-casing forming a section of the hopper. Fig. 11 represents a horizontal section of one of the superheating and decomposing chambers, showing the damper. Fig. 12 represents a vertical section of a portion of one of the gas-outlet pipes and its controlling-valve. Fig. $12^a$ represents an elevation of the same pipe.

In the following description like letters of reference designate the same parts in all the figures of drawings.

Three generating-chambers, A B D, are provided, for containing the fuel or other material from which gas is generated. They are united by a common base, C, and connected at the base above the grate-bars by passages $c\ c'$. The middle chamber, D, is made the largest, as gases from each of the side chambers are passed into and through it.

Figure 1:
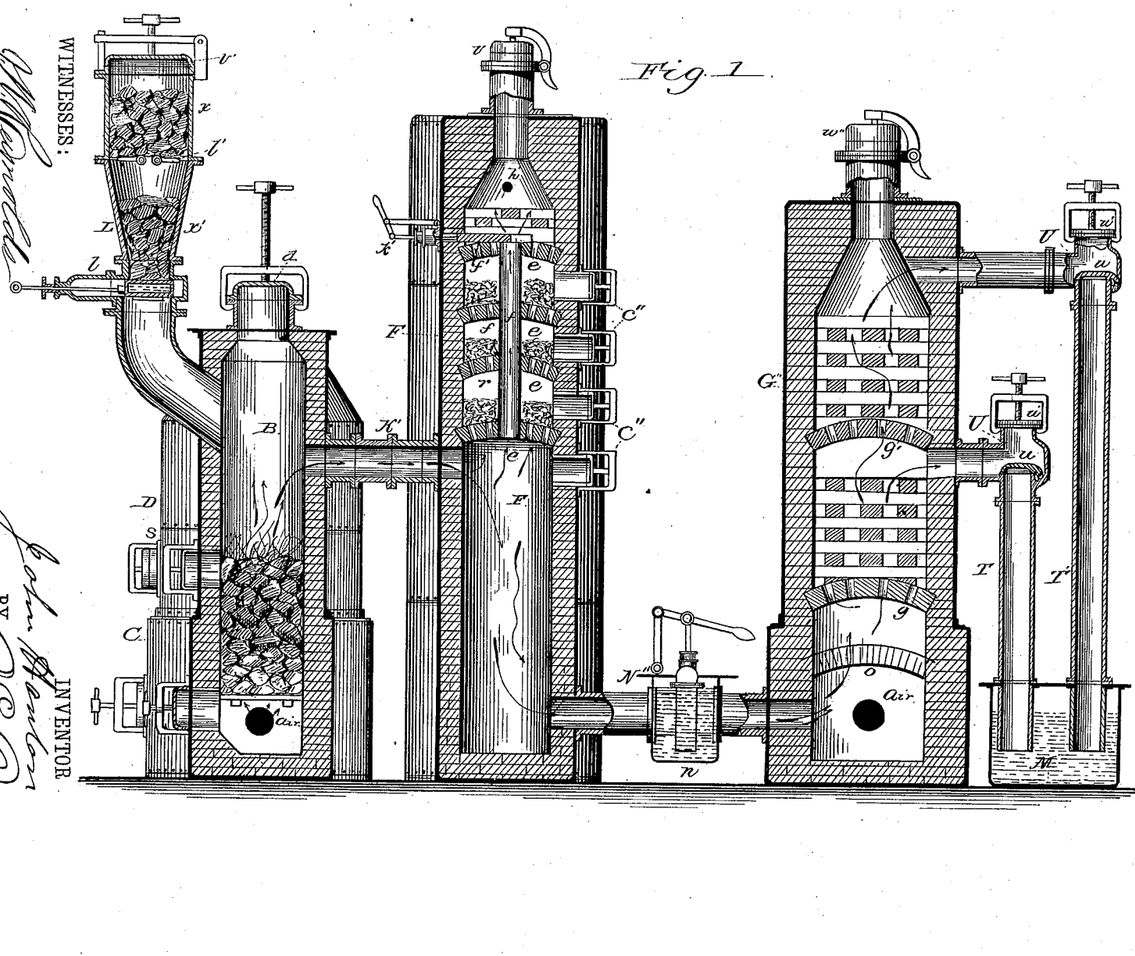
Figure 1 represents a longitudinal vertical section of the apparatus on line $y\ y$ in Fig. 6.
Figure 2:
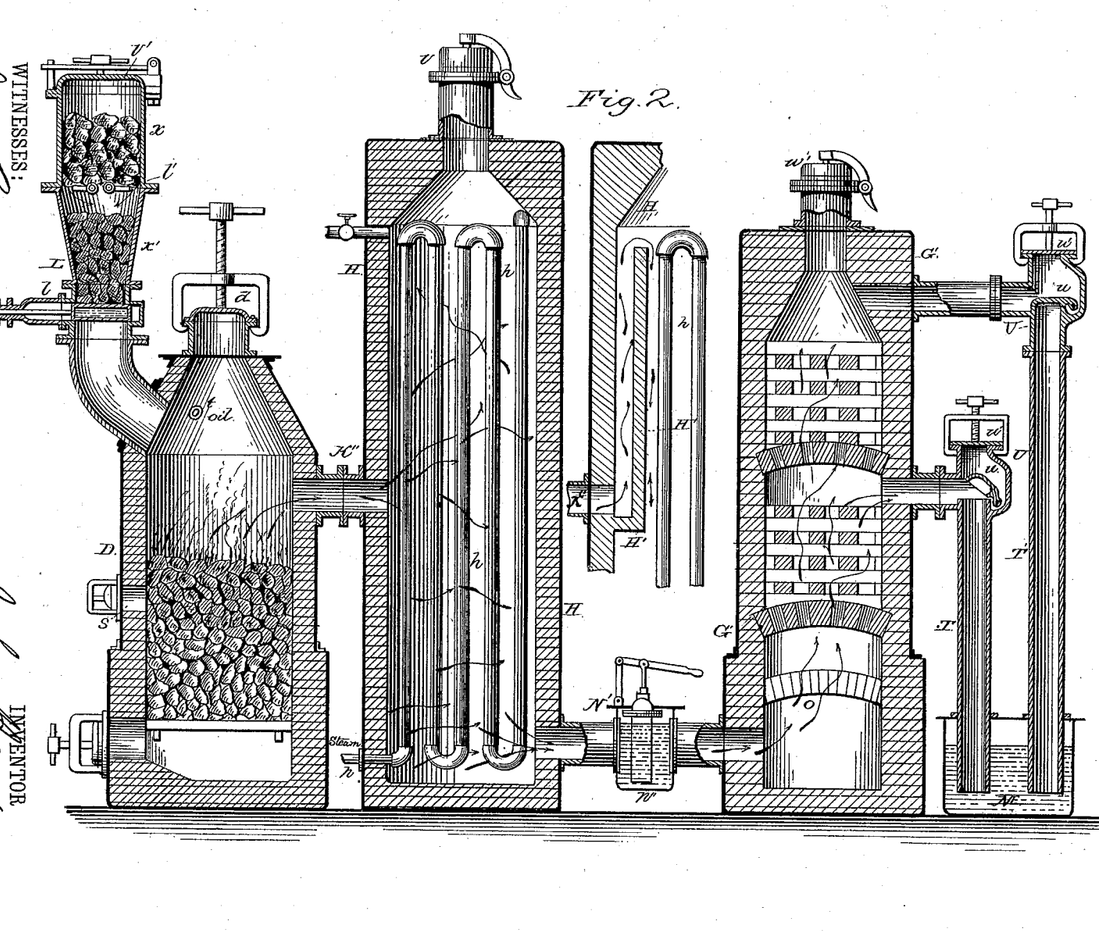
Fig. 2 represents a longitudinal vertical section on line $x\ x$ in Fig. 6.
Figure 3:
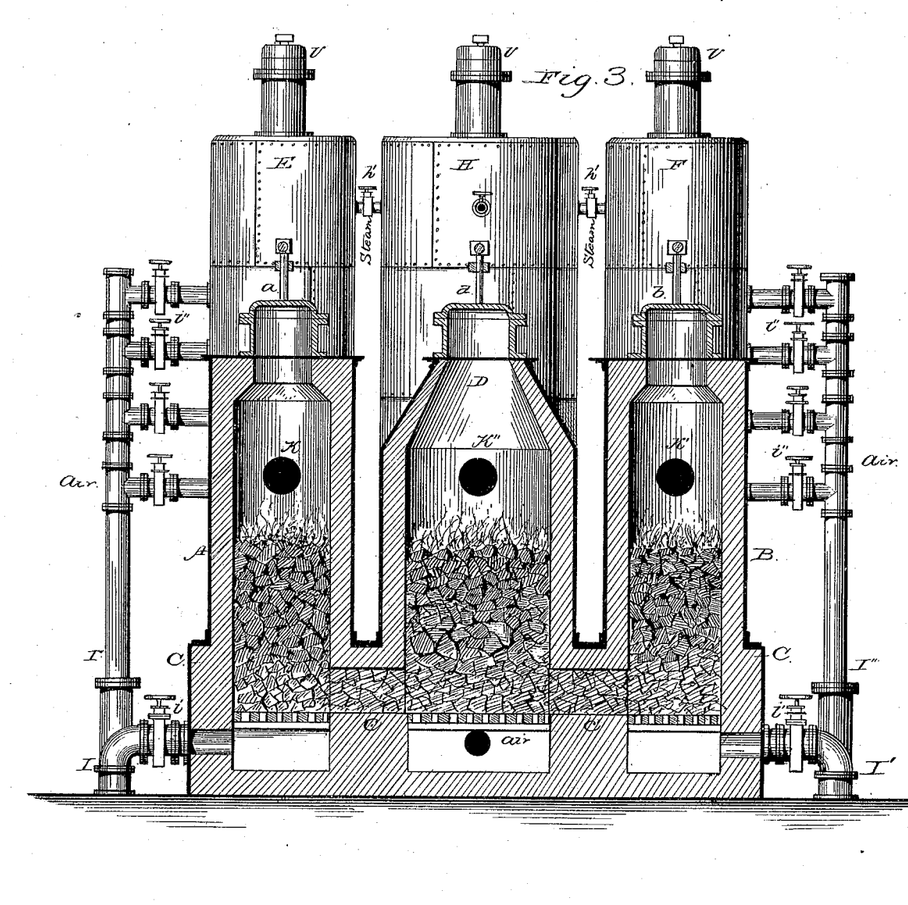
Fig. 3 represents a vertical cross-section through the generators on line $z'\ z'$ in Fig. 6.
Figures 4, 13:
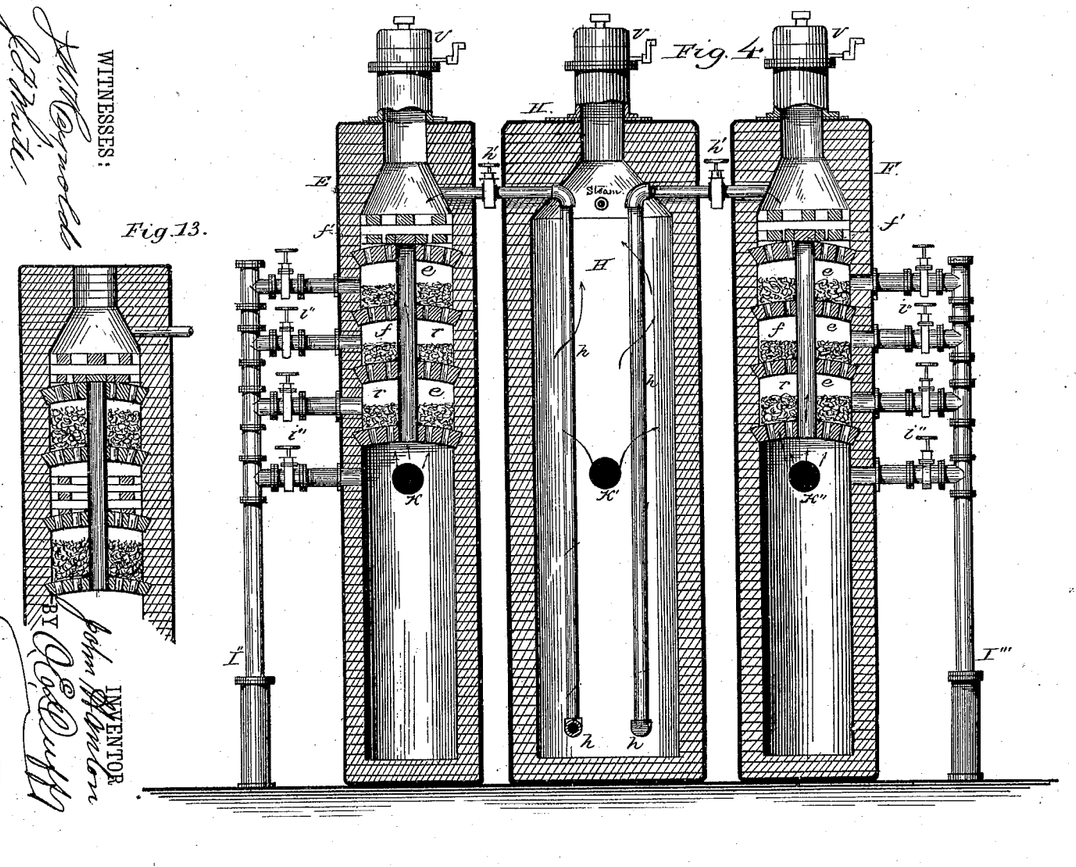
Fig. 4 represents a vertical cross-section through the steam superheaters and decomposers on line $z\ z$, looking to the left, in Fig. 6.
Fig. 13 represents a vertical section of a steam-superheater, showing a modification.
Figure 5:
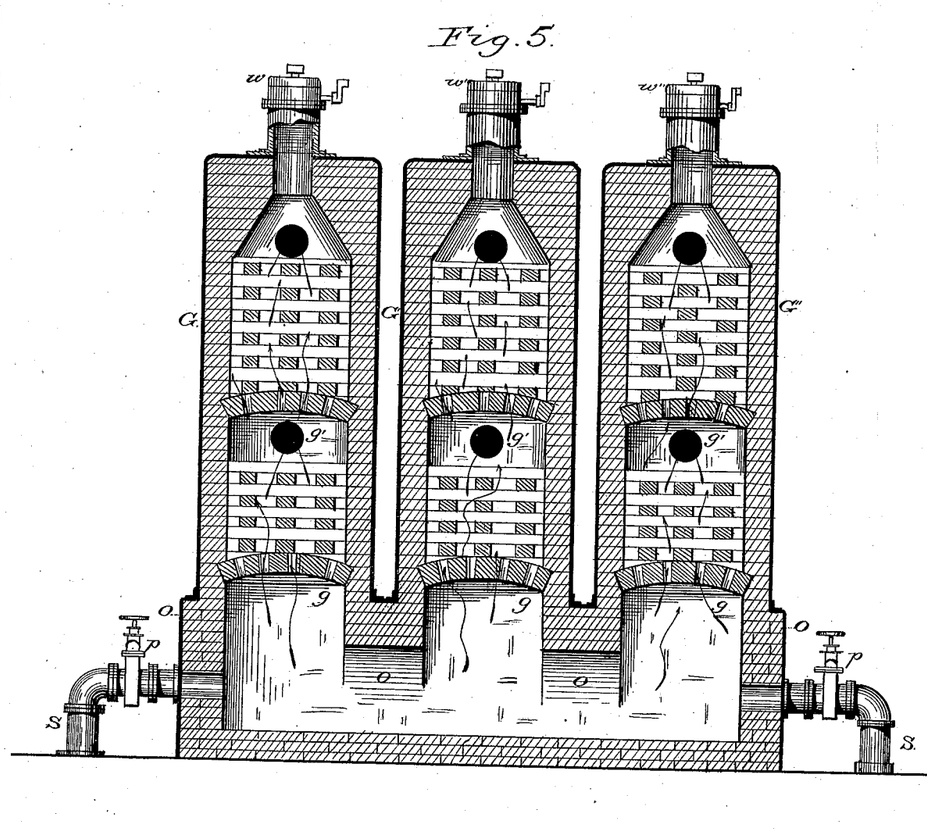
Fig. 5 represents a vertical cross-section through the fixing-chambers on line $y'\ y'$ in Fig. 6.
Figure 6:
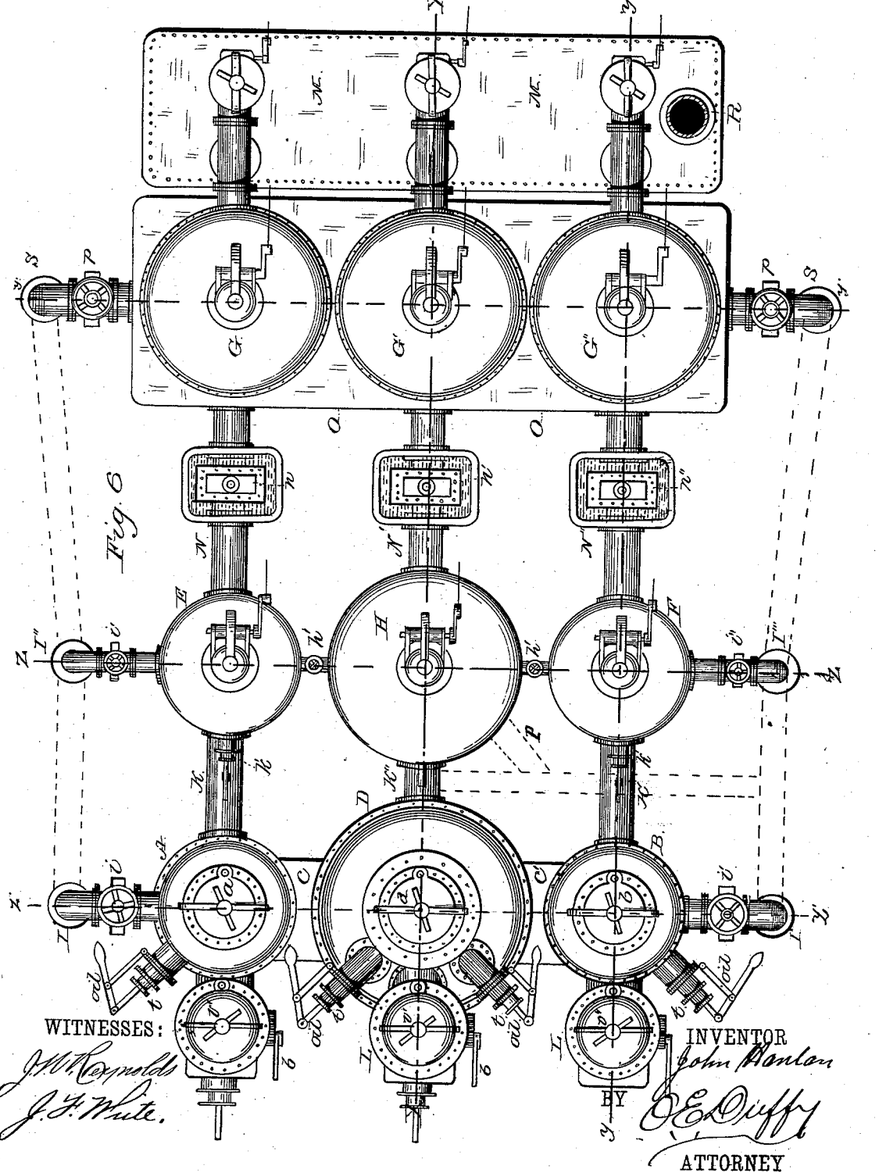
Fig. 6 represents a top plan view of the apparatus.
Figure 7:
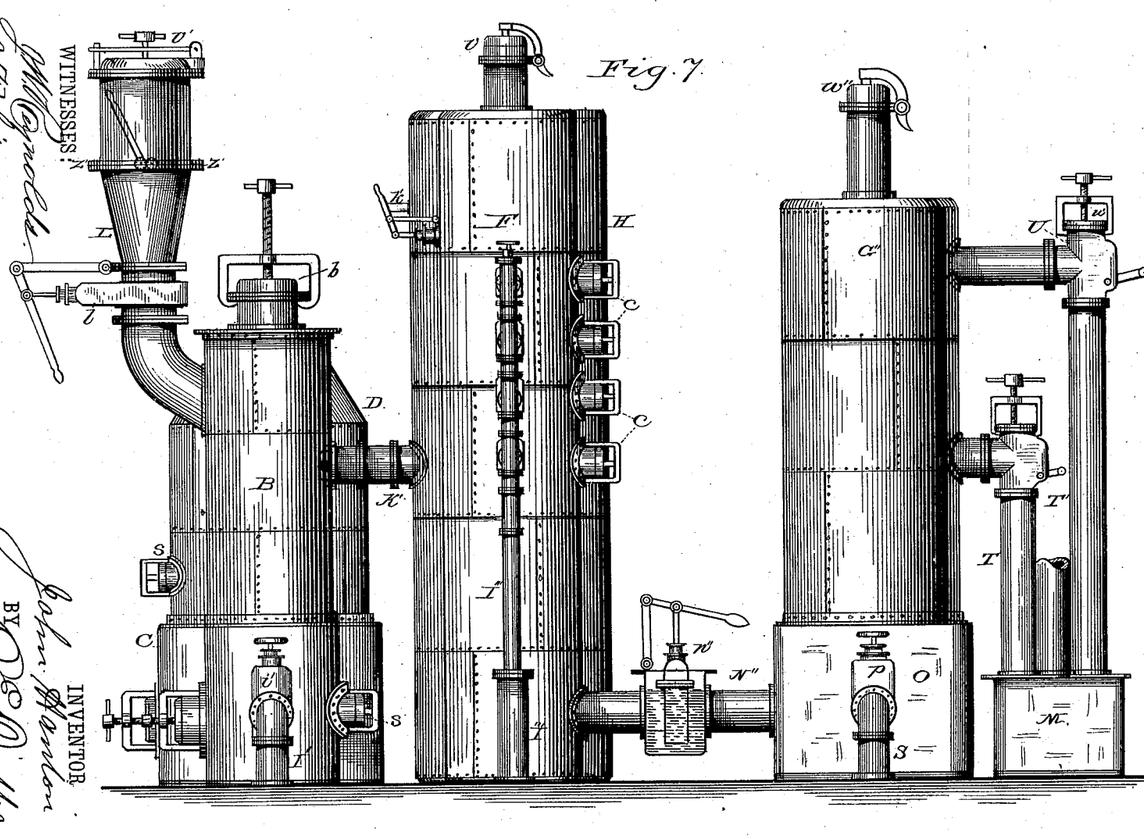
Fig. 7 represents a side elevation.
Figure 8:
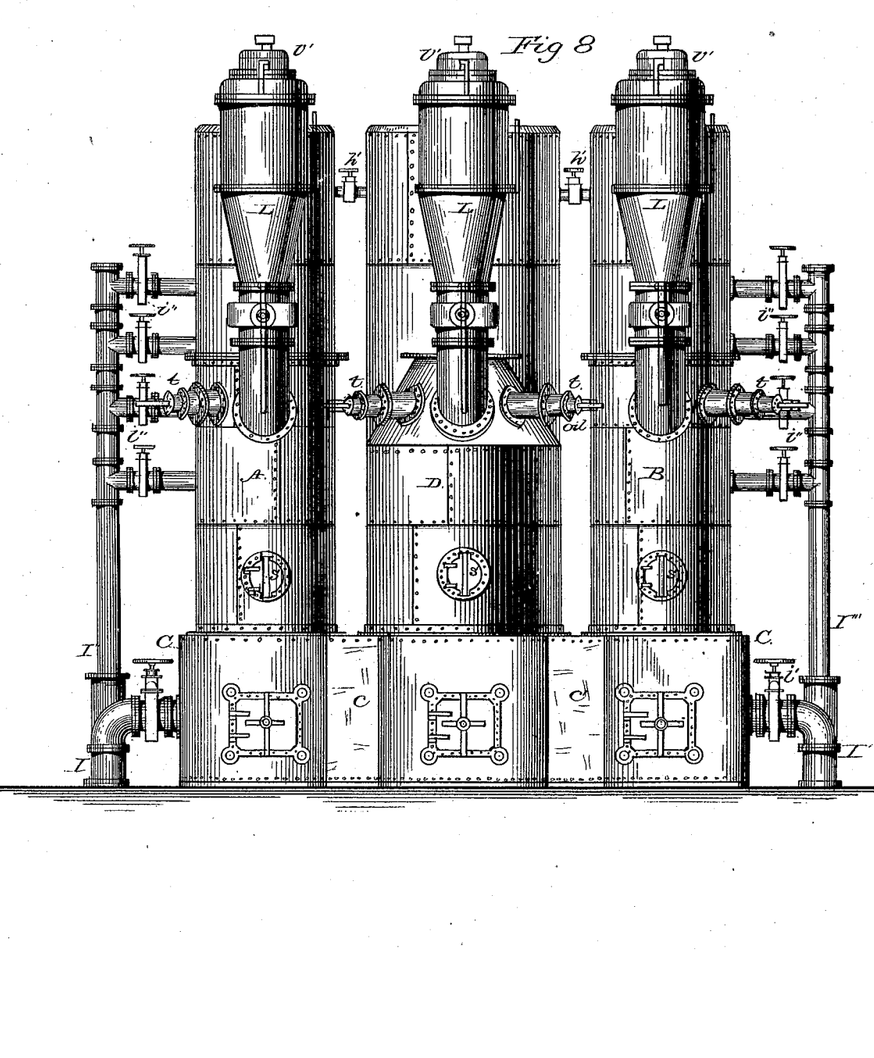
Fig. 8 represents a front elevation.
Figure 9:
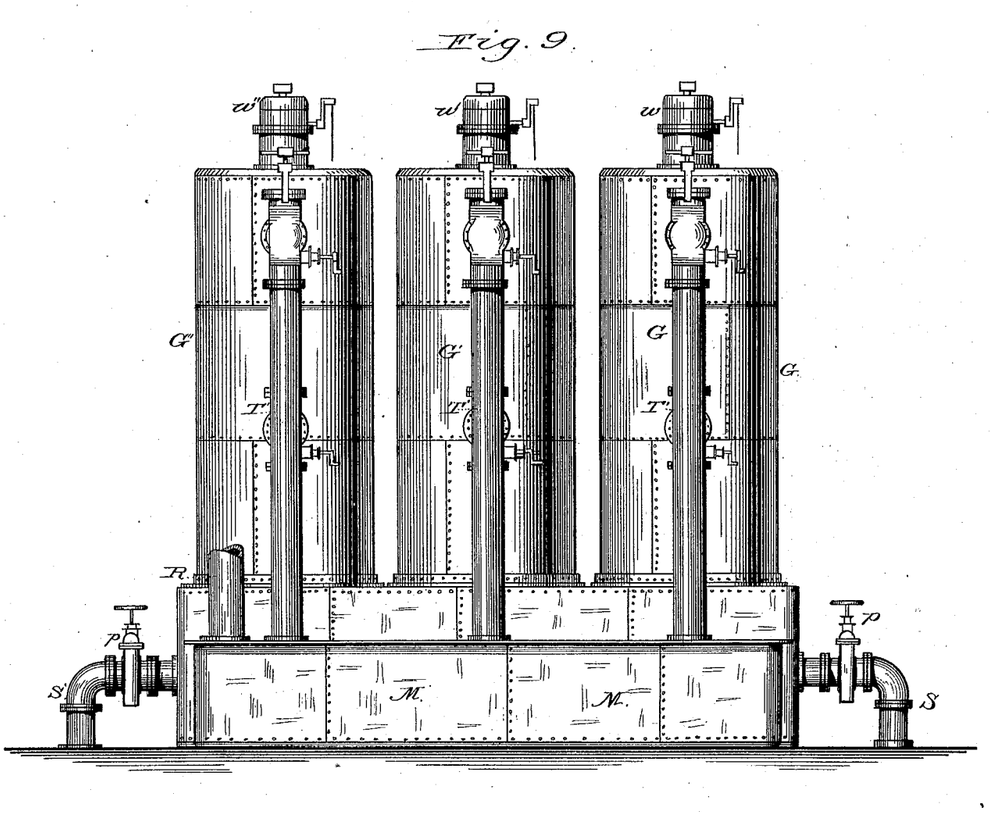
Fig. 9 represents a rear elevation.
Figures 10, 10A, 10B, 11, 12, 12A:
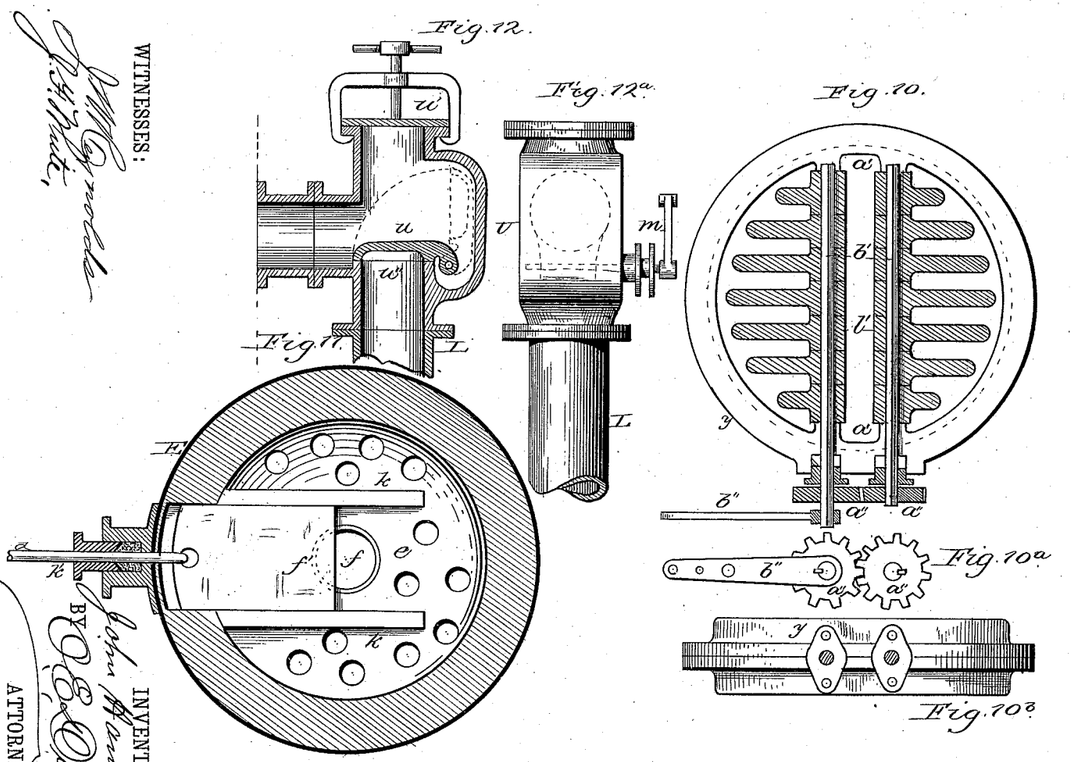

D is the distilling-chamber for bituminous coal, resinous wood, bones, &c., while A and B are the decomposing-chambers, and should contain hard coal, coke, or charcoal. These chambers, as well as the other chambers of the apparatus, are built of fire-brick covered by tight jackets of plate-iron. Each chamber A B D has a separate grate and ash-pit, and each ash-pit has a separate cleaning-opening closed externally by a tight-fitting door. Air-blast pipes I I', having valves $i\ i'$, connect with the ash-pits of chambers A and B. Tight-fitting removable caps $a\ b\ d$ are secured over the openings at the tops of chambers A B D, and each chamber is provided with openings having tight-fitting caps for the insertion of clinkering-bars. A fuel-charger, L, connects with each chamber. Sliding oil-supply pipes $t$ connect with the tops of the chambers. A steam superheating and decomposing chamber, E, connects by pipe K with chamber A, and a similar chamber, F, connects by pipe K' with chamber B, as shown in Fig. 1. Both of the chambers E and F are constructed alike and perform the same function. The gas-conducting and steam-superheating chamber H connects by pipe K'' with distilling-chamber D, as shown in Fig. 2. Chambers E, F, and H connect by pipes N N' N'', leading from the base of each, with the base O of the fixing-chambers G G' G''. The steam superheating and decomposing chambers E F are provided with perforated arches of refractory material e, four of which are shown, though a greater or less number may be used. A fire-clay tube or flue, f, passes up through the arches, and is provided at the top with a damper, f', of refractory material, fitted to slide between guideways k, as shown on enlarged scale in Fig. 11. The damper has an operating-rod, k', passing through a stuffing-box in the shell of the chamber. The flue and damper serve to control the supply of hot gas to the brick-work above the upper arch. Iron or other suitable metal scrap, r, is placed on the two lower arches, and may be placed on the third arch, if desired. Refractory brick are loosely laid up on one or more arches above the iron-scrap for superheating steam. Openings c'', having tight-fitting caps, lead into the apartments between the arches for inserting and removing the scrap metal. Air-blast pipes I'' I''' connect, by branches having valves i'', with the different apartments of the steam superheating and decomposing chambers, as shown in Figs. 4 and 6. The gas-conducting and steam-superheating chamber H is preferably provided with a deflecting wall or partition, H', of fire-clay, rising from a shelf just below the inlet of gas-pipe K'', to cause inflowing gas to pass through the entire length of the chamber. Two sets of steam-coil or gangs of vertical pipe, h, with return-bends, are located in chamber H, and connect, respectively, by branches h' h', having valves, with the tops of chambers E and F, as shown in Fig. 4. The steam-superheating pipes h may be made of iron, copper, or other suitable metal.
Chambers E F H are provided with short stacks having tight-fitting caps v, having operating rods and cranks, as shown in Fig. 4. Air-blast pipe P, having a valve, connects with the base of chamber H, though air is seldom admitted to this chamber, as illuminating-gas only is passed through it on its way to the fixing-chambers. An air-blast should also connect with the ash-pit of chamber D. Chambers E F H are connected by pipes N N' N'', leading from their bases, with the base O of fixing-chambers, and such pipes are provided with water-cooled valves n n' n'', of the construction shown and claimed in a patent granted me June 17, 1884, No. 300,602.
Valves n n'' control the flow of gaseous products from chambers A B and E F for heating up the fixing-chambers, and valve n' controls the flow of illuminating gas and vapor from chambers D and H to the fixing-chamber to be fixed. The three fixing-chambers G G' G'' are built upon a common base, O, and each is provided with two perforated arches, g g', supporting loosely-laid refractory brick. Arches o in the base support the walls of the chambers, and provide passages in the base from one chamber to another. Gas-eduction pipes T T', connecting at different heights in the fixing-chambers, lead to the hydraulic seal-box M, and pipe R conducts gas from such box to the scrubber or purifiers. An air-blast pipe, S, having valve p, connects with each end of base O, for supplying air to support combustion of gaseous products in the fixing-chambers. Three fixing-chambers divided into apartments, and having gas-eduction pipes at different heights, are provided, so that different chambers may be heated to different degrees of temperature, and so that the illuminating-gas made during a run may be passed through different portions of heated brick-work, always at the proper temperature for combining and fixing the gas without reducing the hydrocarbons to lamp-black or solid carbon. The chamber heated to the highest temperature is used last during a run, so that it will be at the proper temperature when gas is passed through it. The fixing-chambers have short stacks at their tops, provided with tight-fitting caps w w' w'', for the escape of products of combustion when heating up the chambers. The gas-eduction pipes T T' have enlarged heads U, provided with a recess for the valve u, and its rod or hinge-bolt m, as shown on large scale in Figs. 12 and 12$^a$. A rim or lip, u'', having a ground face, projects up into head U as a valve-seat for valve u, which also has a ground face. The hinge-bolt m, to which the valve is rigidly secured, passes through and turns in a stuffing-box in the side of head U, and to its outer end is secured an operating-lever. Tight-fitting caps u' are secured to tops of heads U, to give access to the valves and for cleaning the pipes. The fuel-charger L is similar to the one shown in a patent granted me June 17, 1884, No. 300,466. It has a water-cooled valve, l, at the bottom, and is divided by a double-hinged valve, l', into a charge-chamber, x', below, and a storage-chamber, x, above, and has a tight-fitting cap, v', at the top. The double-hinged valve and its operating mechanism are shown in detail on a large scale in Figs. 10, 10$^a$, and 10$^b$. The valve-casing y is provided internally with bosses a' for supporting rods of the valve, which latter is preferably divided into fingers, as shown. The outwardly-projecting ends of the valve-rods have keyed to them the pinion-wheels a'', arranged to mesh with each other, and to one of the rods is secured a lever, b'.

Having described my apparatus, I will now describe its operation as follows: Fires are kindled on the grates of chambers A B D, coal is gradually fed in. and the air-blasts admitted till highly-heated beds of fuel several feet thick are formed. As soon as combustible carbonic oxide is formed during the blasting operation it is passed up through the iron-scrap and burned by admission of air in the brick-work above in chambers E and F, the products of combustion escaping through the stacks, the caps of which are open. In order to more highly heat the brick-work after the iron-scrap is heated the dampers $f'$ are drawn out and the hot gaseous products passed up through tubes $f$ and burned by air admitted through the upper valve, $i''$, in a branch of air-blast pipe $l''$. Hot gaseous products from chambers A B are also passed through flues in the lower parts of chambers E F, and through pipes N N'', the valves of which are open into base O of the fixing-chambers, where they are burned by the admission of air through pipes S, the valves $p$ of which are open. The caps of the stacks are also opened for the escape of the products of combustion. Carbonic oxide may also be passed from chamber D through chamber H and pipe N' into base O and burned, or such gas may be burned in chamber H and the products passed out of its stack. Chamber G being properly heated to fix the gas during the first period of the run, (five to ten minutes,) the cap $w$ thereof is closed. Chamber G' is heated to a higher temperature, as it is to be used for fixing gas during the second period (five to ten minutes) of the run, and then its cap $w'$ is closed; and chamber G'' is most highly heated, as it is to be used for fixing gas during the last period (five to ten minutes) of the run, and then its cap $w''$ is closed. During the operation of heating up, steam is admitted into the coils or gangs of pipe in chamber H. The brick-work in chambers E and F should be most highly heated, and the iron-scrap should be raised to or above a cherry-red. The fuel in chamber A B should be raised to incandescence, while that in chamber D should only be heated to a moderate temperature, suitable for distilling bituminous coal, wood, &c. The apparatus being properly heated, the air-blasts are shut off, the caps of the stacks are all closed, dampers $f'$ are closed, valves $n$ $n''$ are closed, ash-pit doors are closed, one or both valves $u$, in one or both eduction-pipes T T' of fixing-chamber G are opened, a charge of soft coal is dropped into chamber D, and superheated steam is passed from pipes $h$ by opening valves $h'$, Fig. 4, into steam superheating and decomposing chambers E and F, passing first into the highly-heated brick-work, where it is intensely heated, and thence into the iron-scrap, where it is partially or wholly decomposed, forming hydrogen and oxide of iron. The hydrogen and any steam remaining undecomposed are passed down through the beds of fuel in chambers A and B, where decomposition of the steam is completed, and the resulting gas—mostly hydrogen—is passed up into and through the distilling soft coal in chamber D, and carries off the rich carbureted gases and vapors evolved from such coal. Should it be desired to still further enrich the gas, hydrocarbon oil is admitted by pipes $t$ into the top of chamber D, which oil, falling into the stream of hot gas, is vaporized and mingled with the gas. The carbureted gas passes through pipe K'', chamber H, and pipe N', into and through fixing-chamber G, where it is combined and converted into a fixed homogeneous gas. After the first period (five to ten minutes) of the run, the valves in eduction-pipes leading from chamber G are closed and those in eduction-pipes leading from chamber G' are opened, and at the last period of the run the last-mentioned valves are closed and those in the pipes of chamber G'' are opened, so that the gas, during the full time of the run, is presented to brick-work of nearly uniform or slightly increasing temperature, and is thus uniformly combined and fixed. Hot illuminating-gas passing through chamber H superheats steam in the pipes, and such steam longer maintains the heat and decomposing action of the iron-scrap. The manufacture of gas is continued, as described, till the apparatus is reduced too low in temperature to decompose steam and fix the gas, when the steam and oil are shut off, and the apparatus is reheated, as before described, except that the air-blast is not admitted to chamber D. In reheating the apparatus the hot carbonic oxide is passed through the oxidized iron-scrap without air, thereby reducing it to the metallic state and changing the carbonic oxide to carbonic acid. The iron thus revivified and reheated is in condition to again decompose steam. Before again resuming the manufacture of illuminating-gas a charge of soft coal or of equivalent material is dropped into chamber D. Chambers A and B are periodically charged with hard coal or coke, as required.

By the arrangement of the fuel-chambers as shown, and conducting the operation as described, chamber D is made a perfect distilling-chamber for converting bituminous coal or resinous wood into gas without the formation of lamp-black or hard carbon. D is also the carbureting-chamber. By placing the iron-scrap below the heated brick-work in the steam superheating and decomposing chambers E F, it acts longer and more effectually to decompose steam, and thus increase the volume of pure hydrogen produced.

I am aware that the production of hydrogen has been described in which ordinary wet steam was to be admitted to a body of heated iron-scrap for decomposition, and the hydrogen so produced was to be passed through incandescent fuel and afterward carbureted. I have learned, however, by practical experiment, that ordinary steam so rapidly reduces the temperature of the iron-scrap as to put a stop to the formation of hydrogen very shortly, and that the process was not practically operative; but by first highly superheating steam, as above described, and then passing it into the heated iron-scrap, the production of hydrogen becomes a practical success, and I therefore claim superheated steam in the production of hydrogen.

I claim—

1. The process of uniformly combining and fixing the mixed gas and vapor produced during an ordinary run in a gas-generating furnace, which consists in heating a comparatively large body or several bodies of refractory material in a fixing chamber or chambers to the proper temperature, then passing the mixed gas and vapor produced during the first period (five to ten minutes) of the run through a portion of such heated refractory material to the main, then passing the succeeding volumes of mixed gas and vapor produced during the succeeding period (five to ten minutes) of the run through another portion of heated refractory material and to the main, and thus on to the end of the run, whereby destructive decomposition of the hydrocarbons is prevented and a uniform quality of gas, as to candle-power, is produced.

2. In the manufacture of illuminating-gas, the process of uniformly combining and fixing the mixed gas and vapor produced in an ordinary run in a gas-generating furnace, which consists in heating two or more bodies of refractory material to successively higher temperatures from the first upward, then passing mixed gas and vapor produced during the first period (five to ten minutes) of the run through the refractory material at the lowest temperature to the main, then passing the succeeding volume of mixed gas and vapor produced during the succeeding period (five to ten minutes) of the run through the next higher heated body of refractory material to the main, and thus on to the end of the run, for the purpose described.

3. The process of manufacturing gas which consists in highly superheating steam in contact with heated brick-work, passing such steam down through heated metallic scrap, producing hydrogen, then passing the hydrogen, together with any undecomposed steam, through one or more bodies of heated carbonaceous material for fully converting all watery vapor into fixed gas.

4. The process of manufacturing gas which consists in highly superheating steam and then passing it down through heated iron-scrap, thereby producing hydrogen, then passing such hydrogen, together with any undecomposed steam, through a body of heated carbonaceous material for completing the decomposition of the steam, then carbureting the resulting gas with hydrocarbon vapors from liquid or solid material in a heated chamber.

5. The process of manufacturing gas which consists in superheating steam, decomposing it in contact with heated iron-scrap, passing the resulting hydrogen gas, together with any remaining undecomposed steam, through one or more bodies of heated carbonaceous material for completing decomposition of the steam into fixed gas, then carbureting the gas and fixing it by passing volumes of it made in successive periods through successive bodies of heated refractory material to the end of the run, whereby destructive decomposition of hydrocarbons is prevented and a uniform quality of gas is produced.

6. The process of generating hydrogen gas which consists in first highly superheating steam, then passing it through one or more beds of heated iron-scrap or other similar metal, thereby oxidizing said scrap and partially decomposing the steam, then further superheating and decomposing any remaining portion of the steam by passing it through heated refractory material and one or more beds of heated metallic scrap, and thus passing the steam, in company with the hydrogen formed, through alternate bodies of heated refractory material and heated metallic scrap until a complete decomposition of the steam is obtained.

7. The process of manufacturing gas which consists in first highly superheating steam, then decomposing said steam by passing it through heated iron-scrap or similar metal, and then passing the resulting gas through one or more bodies of incandescent fuel, substantially as described.

8. The process of manufacturing gas which consists in first highly superheating steam, then decomposing said steam by passing it through heated iron-scrap or similar metal, thereby oxidizing said scrap, and then passing the product through one or more bodies of incandescent fuel, and alternately reducing the oxidized scrap to a metallic condition by subjecting it to the action of nascent carbonic oxide, thereby enabling the continued use of said scrap without removal from the apparatus, substantially as described.

9. The process of manufacturing gas which consists in first highly superheating steam, then decomposing said steam by passing it through heated iron-scrap or similar metal, then passing the product through heated refractory material, and then through one or more bodies of incandescent fuel, substantially as described.

10. The process of manufacturing illuminating-gas which consists in first highly superheating steam, then decomposing said steam by passing it through heated iron-scrap or similar metal, then passing the product through one or more bodies of incandescent or highly-heated fuel, and then enriching said gas by mingling with it the vapor of a hydrocarbon, and finally fixing the gas by passing it, in conjunction with said hydrocarbon vapor, through a heated fixing-chamber, substantially as described.

11. The process of manufacturing illuminating-gas which consists in first highly superheating steam, then decomposing said steam by passing it through heated iron-scrap or similar metal, then passing the product through one or more bodies of incandescent or highly-heated fuel, then enriching the gas so produced by adding to it the products of distillation of soft coal, finally adding to said mixture the vapor of a hydrocarbon, and then fixing said gas and vapor by passing them through a heated fixing-chamber, substantially as described.

12. The three fuel-chambers connected by a common base, and consisting of two side decomposing-chambers, each having an inlet for steam or other gaseous fluid near its top, and the central distilling-chamber having a gas-outlet near the top, for the purpose described.

13. In combination with a fuel-chamber of a gas apparatus, a steam superheating and decomposing chamber having one or more bodies of iron-scrap on its lower supports, and having a body of refractory brick-work above the iron-scrap, as and for the purpose described.

14. In a gas-generating apparatus, a steam superheating and decomposing chamber having two or more perforated arches, with iron-scrap on the lower arch and loosely-laid brickwork on the upper arch, and having a steam-inlet pipe at the top and an outlet-pipe below the lower arch, for the purpose described.

15. In a gas-generating apparatus, a steam superheating and decomposing chamber having perforated supporting-arches, a tube passing through such arches, means for closing the tube, a steam-inlet pipe, and an outlet-pipe, connected as described.

16. In combination with a gas-generator, two or more fixing-chambers united to a common base, as shown, and each chamber having a valved outlet-pipe, for the purpose described.

17. In combination with the distilling-chamber, the gas-chamber H and the contained coils of steam-superheating pipe connecting with the steam superheating and decomposing chambers, for the purpose described.

In testimony that I claim the foregoing as my own I affix my signature in presence of two witnesses.

JOHN HANLON.

Witnesses:
O. E. DUFFY,
M. P. CALLAN.